United States Patent
Kakinuma et al.

(10) Patent No.: US 12,421,362 B2
(45) Date of Patent: Sep. 23, 2025

(54) RESIN SHEET, MANUFACTURING METHOD OF RESIN SHEET, AND RESIN COVERING METHOD

(71) Applicant: DISCO CORPORATION, Tokyo (JP)

(72) Inventors: Yoshinori Kakinuma, Tokyo (JP); Yoshikuni Migiyama, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 774 days.

(21) Appl. No.: 17/664,746

(22) Filed: May 24, 2022

(65) Prior Publication Data

US 2022/0380564 A1    Dec. 1, 2022

(30) Foreign Application Priority Data

May 31, 2021    (JP) ................................. 2021-091764

(51) Int. Cl.
*C08J 5/18*    (2006.01)
*C08J 7/04*    (2020.01)

(52) U.S. Cl.
CPC ............... *C08J 7/0427* (2020.01); *C08J 5/18* (2013.01); *C08J 2300/00* (2013.01)

(58) Field of Classification Search
USPC ........... 528/190, 193, 196, 271, 272; 521/41
See application file for complete search history.

(56) References Cited

U.S. PATENT DOCUMENTS

| | | | | |
|---|---|---|---|---|
| 3,450,613 A | * | 6/1969 | Steinberg | C08F 299/026 522/170 |
| 4,256,828 A | * | 3/1981 | Smith | C08G 59/62 522/146 |
| 6,245,827 B1 | * | 6/2001 | Gregory | C08G 59/24 526/333 |

FOREIGN PATENT DOCUMENTS

| | | | | |
|---|---|---|---|---|
| JP | 2013175647 A | | 9/2013 | |
| JP | 2017050536 A | | 3/2017 | |
| WO | WO-2016003983 A1 | * | 1/2016 | ......... B29C 35/0894 |

* cited by examiner

*Primary Examiner* — Terressa Boykin
(74) *Attorney, Agent, or Firm* — Greer Burns & Crain Ltd.

(57) ABSTRACT

A manufacturing method of a resin sheet that is capable of being deformed, covering a front surface of a substrate, and protecting the substrate and that is capable of curing by being given energy from the external includes a liquid resin disposing step of disposing a liquid resin capable of curing by being given the energy from the external on a flat surface and a surface curing step of forming a resin coat layer through curing only an outer circumferential surface of the liquid resin by giving the energy with such intensity that the whole of the liquid resin does not cure to the liquid resin from the external and leaving the liquid resin that is not cured inside the resin coat layer.

8 Claims, 5 Drawing Sheets

RESIN SHEET, MANUFACTURING METHOD OF RESIN SHEET, AND RESIN COVERING METHOD

BACKGROUND OF THE INVENTION

Field of the Invention

The present invention relates to a resin sheet that can cover a front surface of a substrate such as a semiconductor wafer in order to protect the front surface of the substrate, a manufacturing method of the resin sheet, and a method for covering a front surface of a substrate by a resin.

Description of the Related Art

Device chips used for pieces of electronic equipment such as mobile phones and computers are formed by grinding and thinning a substrate on which plural devices are disposed to be arranged on a front surface from the back surface side and dividing the substrate for each device. The grinding of the substrate is executed by a grinding apparatus. In the grinding apparatus, the substrate is held by a chuck table in a state in which the back surface side is exposed upward, and a grinding abrasive stone that moves on a circular annular locus is brought into contact with the back surface side of the substrate to grind the substrate. At this time, a protective component in which a base layer and a glue layer are stacked is stuck to the front surface of the substrate in advance in order to protect the front surface side of the substrate.

Patterns that configure the devices and wiring lines and so forth are disposed on the front surface side of the substrate. Furthermore, bumps that become electrodes of the devices are formed on the front surface side of the substrate in advance in some cases. That is, a recessed and protruding shape of various patterns, bumps, and so forth is formed in the front surface of the substrate. When the height difference in the recesses and protrusions of the front surface of the substrate is large, the recesses and protrusions are not sufficiently absorbed by the glue layer when the protective component is stuck to the front surface of the substrate and fixing of the protective component becomes unstable. Moreover, the surface of the protective component on the base layer side does not become flat, and the substrate is not evenly supported by the chuck table of the grinding apparatus. When the substrate is ground in this state, the back surface of the substrate does not become flat. Thus, the following method has been developed (refer to Japanese Patent Laid-open No. 2013-175647 and Japanese Patent Laid-open No. 2017-50536). A liquid resin is supplied onto a sheet, and a substrate is placed on the liquid resin in a state in which the front surface side of the substrate is oriented downward. Then, the substrate is pressed from the upper side, and the liquid resin is caused to infiltrate recesses and protrusions of the substrate. Subsequently, the liquid resin is cured to form a protective component.

SUMMARY OF THE INVENTION

For example, in a case in which the liquid resin is an ultraviolet-curable resin, if the liquid resin is excessively irradiated with ultraviolet in curing of the liquid resin, the adhesive force of the liquid resin lowers, and the formed resin layer becomes more likely to be separated. On the other hand, the liquid resin does not sufficiently cure when the amount of irradiation with ultraviolet is too small. Thus, it is desired that the liquid resin is irradiated with ultraviolet under an appropriate irradiation condition. However, particularly when large recesses and protrusions are formed in the front surface of the substrate, it is not easy to cure the liquid resin evenly and moderately in the whole region of the front surface, and an uncured region is liable to remain in the liquid resin in contact with the front surface of the substrate. In this case, after processing of the substrate is executed, part of the resin is liable to remain on the front surface of the substrate when the resin disposed on the front surface is separated. On the other hand, when irradiation with ultraviolet is executed in such a manner that the whole region of the liquid resin in contact with the front surface of the substrate sufficiently cures, part of the resin is excessively cured, and separation of the resin in processing of the substrate becomes more likely to occur.

The following method is also conceivable. A resin sheet is disposed on a front surface of a substrate in advance along a recessed and protruding shape of the front surface, and a liquid resin is brought into contact with the front surface of the substrate with the interposition of the resin sheet. Then, the substrate is pressed from the upper side, and the liquid resin is cured. In this case, the liquid resin does not directly get contact with the front surface of the substrate, and therefore the resin does not remain on the front surface when the resin is separated from the front surface of the substrate. However, the cost for preparation of the resin sheet and technique and labor for disposing the resin sheet along the recessed and protruding shape of the front surface of the substrate are required.

Thus, an object of the present invention is to provide a resin sheet that can sufficiently absorb recesses and protrusions when being disposed on a substrate having the recesses and protrusions and is less liable to remain on the substrate when being separated, a manufacturing method of the resin sheet, and a resin covering method.

In accordance with an aspect of the present invention, there is provided a resin sheet that covers a front surface of a substrate and protects the substrate. The resin sheet includes a resin coat layer that is made at an outer surface and has flexibility and a liquid resin layer surrounded by the resin coat layer. The resin sheet is deformable and is capable of curing by being given energy from the external.

Preferably, the resin coat layer has a first resin material that is cured and the liquid resin layer has the first resin material that is not cured.

Furthermore, preferably, the energy is ultraviolet or heat.

In accordance with another aspect of the present invention, there is provided a manufacturing method of a resin sheet that is capable of being deformed, covering a front surface of a substrate, and protecting the substrate and that is capable of curing by being given energy from the external. The manufacturing method of a resin sheet includes a liquid resin disposing step of disposing a liquid resin capable of curing by being given the energy from the external on a flat surface and a surface curing step of forming a resin coat layer through curing only an outer circumferential surface of the liquid resin by giving the energy with such intensity that the whole of the liquid resin does not cure to the liquid resin from the external and leaving the liquid resin that is not cured inside the resin coat layer.

Preferably, the liquid resin is an ultraviolet-curable resin or a heat-curable resin.

In accordance with a further aspect of the present invention, there is provided a resin covering method for a substrate by which a front surface of the substrate having recesses and protrusions is covered by a resin sheet. The resin covering method includes a resin sheet preparation step of preparing the resin sheet formed by giving, to a resin of a liquid, energy with such intensity that the whole of the resin does not cure from the external to leave the resin in a liquid state inside the resin and cure only an outer circumferential surface, a resin covering step of covering the front surface of the substrate by the resin sheet prepared in the resin sheet preparation step in such a manner that the resin sheet is caused to follow the recesses and protrusions of the substrate, and a resin curing step of giving the energy to the resin sheet that covers the substrate from the external and curing the whole of the resin sheet after the resin covering step.

Preferably, the resin covering method further includes a processing step of processing a back surface of the substrate after the resin covering step and a separation step of separating the resin sheet that covers the substrate and is cured from the substrate.

Furthermore, preferably, the back surface of the substrate is ground by using a grinding wheel including a grinding abrasive stone in the processing step.

Moreover, preferably, the resin is an ultraviolet-curable resin or a heat-curable resin.

In the resin sheet, the manufacturing method of a resin sheet, and the resin covering method according to the aspects of the present invention, the resin sheet is formed to have the resin coat layer at the outer surface and the liquid resin layer surrounded by the resin coat layer and is placed on the substrate having the recesses and protrusions. When the resin sheet placed on the substrate is pressed from the upper side, the resin sheet is deformed in such a manner as to follow the recessed and protruding shape. The resin sheet internally has the liquid resin layer that can be freely deformed, and therefore can be deformed in such a manner that the recessed and protruding shape of the front surface of the substrate can be sufficiently absorbed. Furthermore, when energy is given from the external to cure the liquid resin layer of the resin sheet in this state, the whole of the resin sheet moderately cures, and the resin sheet comes to function as a protective component.

Because the outer surface of the resin sheet has cured before the resin sheet is placed on the substrate, an uncured region does not exist in the whole region of the resin sheet in contact with the recessed and protruding shape of the substrate. Thus, the resin does not remain on the front surface of the substrate when the resin sheet is separated from the substrate finally. Furthermore, because the outer surface of the resin sheet has been cured in advance, there is no need to excessively execute irradiation with energy such as ultraviolet in order to cure the resin sheet that has entered the recessed and protruding shape of the substrate. Thus, the resin is not excessively cured, and separation of the resin in processing of the substrate is less liable to occur.

Therefore, according to the aspects of the present invention, a resin sheet that can sufficiently absorb recesses and protrusions when being disposed on a substrate having the recesses and protrusions and is less liable to remain on the substrate when being separated, a manufacturing method of the resin sheet, and a resin covering method are provided.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will be described in detail below with reference to the accompanying drawings. In a resin sheet, a manufacturing method of a resin sheet, and a resin covering method according to the present embodiment, the resin sheet has a cured resin coat layer at the outer surface. A liquid resin that is not cured is housed inside the resin coat layer. Furthermore, the resin sheet is placed on a substrate having recesses and protrusions in a front surface and is pressed from the upper side. Then, the resin sheet is given energy and is cured to become a protective component of the substrate. First, the substrate on which the resin sheet is disposed as the protective component will be described.

Figure 2A:
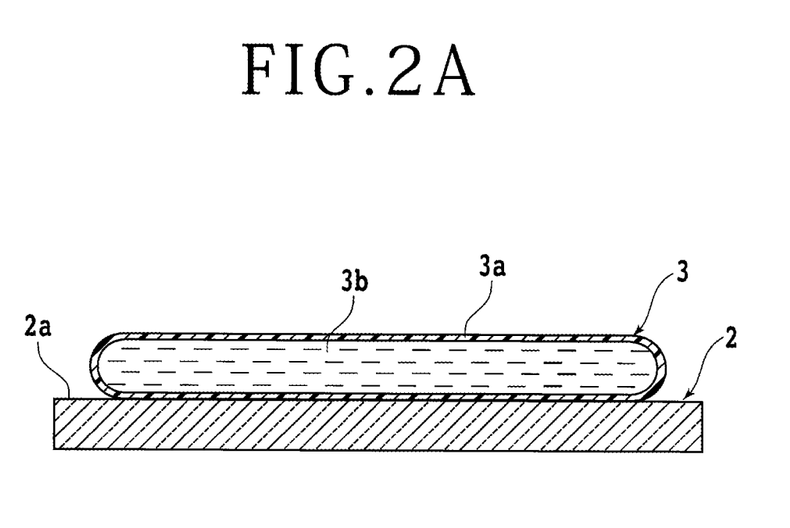
FIG. 2A is a sectional view schematically illustrating a resin sheet having a cured resin coat layer at an outer surface.
Figure 2B:
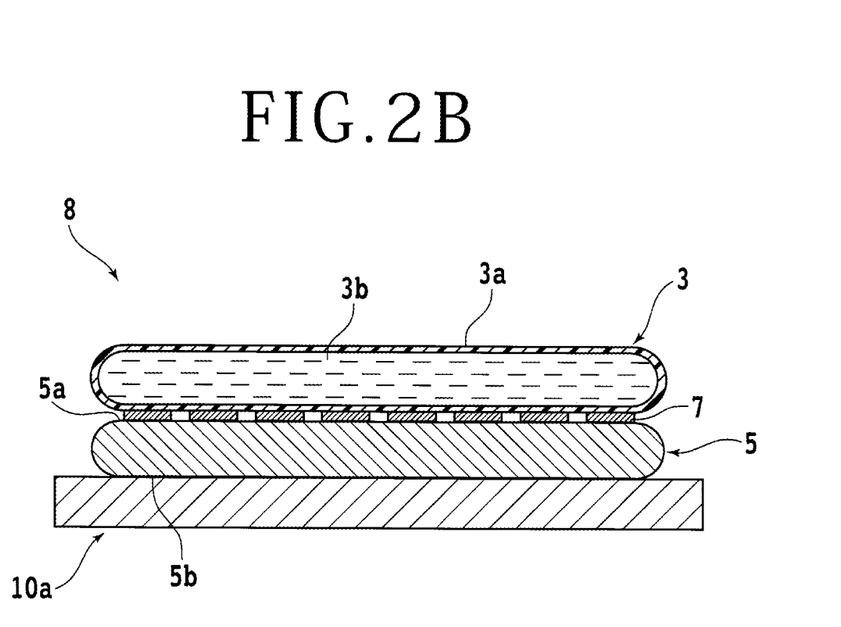
FIG. 2B is a sectional view schematically illustrating the resin sheet placed on a substrate having recesses and protrusions.

In FIG. 2B and so forth, a sectional view schematically illustrating a substrate 5 is included. For example, the substrate 5 is a wafer formed of a material such as silicon (Si), silicon carbide (SiC), gallium nitride (GaN), gallium arsenide (GaAs), or another semiconductor. Alternatively, the substrate 5 is a substrate or the like that is composed of a material such as sapphire, glass, or quartz and has a substantially circular plate shape. Plural planned dividing lines that intersect each other are set in a front surface 5a of the substrate 5. Devices 7 such as integrated circuits (ICs) and large scale integration (LSI) circuits are formed in the respective regions marked out by the planned dividing lines. When the substrate 5 is ground from the side of a back surface 5b and is thinned and the substrate 5 is divided along the planned dividing lines, individual device chips can be formed. Plural protruding parts that are formed of a metal and are referred to as bumps (not illustrated) are disposed on the front surface 5a of the substrate 5 in some cases. Each of the bumps is electrically connected to the device 7 and functions as an electrode in inputting/outputting of an electric signal to/from the device 7 when the substrate 5 is divided and the device chips are formed. The bumps are formed of a metal material such as gold, silver, copper, or aluminum, for example. However, the bumps do not necessarily have to be disposed on the front surface 5a of the substrate 5.

The substrate 5 for which the front surface 5a is covered by a resin is not limited thereto. For example, the substrate 5 may be a package substrate formed through sealing of plural devices arranged on a flat surface by a sealing resin.

When the package substrate is thinned by grinding the sealing resin on the back surface side of the package substrate and the package substrate is divided for each device, individual device chips that are sealed by the sealing resin and have a predetermined thickness can be formed. Bumps that become electrodes of the individual devices are formed on the front surface of the package substrate and therefore the front surface of the package substrate is also not flat and includes recesses and protrusions.

When the substrate 5 is ground from the side of the back surface 5b, a protective component is stuck to the side of the front surface 5a in advance in order to protect the side of the front surface 5a. Conventionally, when recesses and protrusions of the front surface 5a of the substrate 5 are small, a tape-shaped protective component in which a base layer and a glue layer are stacked is stuck to the front surface 5a of the substrate 5. The exposed surface (surface on the base layer side) of the protective component stuck to the substrate 5 is flat, and the substrate 5 is properly supported when the substrate 5 is placed on a support table (chuck table) with the exposed surface oriented downward. However, when the recesses and protrusions on the side of the front surface 5a of the substrate 5 are large, the recesses and protrusions cannot be sufficiently absorbed by the glue layer of the protective component, and the protective component stuck to the substrate 5 gets deformed. Thus, the exposed surface on the base layer side does not become flat. In this case, the substrate 5 is not properly supported by the support table when the substrate 5 is carried in to a grinding apparatus, and the back surface 5b of the substrate 5 does not become flat when the substrate 5 is ground from the side of the back surface 5b. Thus, it is conceivable that a liquid resin is supplied onto the front surface 5a of the substrate 5, and the liquid resin is cured to form a protective component.

For example, the liquid resin is supplied onto a sheet, the front surface 5a of the substrate 5 is oriented toward the liquid resin, and the substrate 5 is placed on the liquid resin. Then, the substrate 5 is pressed from the upper side, and thereafter the liquid resin is cured. When an ultraviolet-curable resin is employed as the liquid resin, the liquid resin can be cured by ultraviolet. However, when the liquid resin is excessively irradiated with ultraviolet, the adhesive force of the liquid resin lowers, and a formed resin layer becomes more likely to be separated. On the other hand, the liquid resin does not sufficiently cure when the amount of irradiation with ultraviolet is too small. Particularly in the region in contact with the front surface 5a of the substrate 5 having a recessed and protruding shape in the front surface 5a, it is not easy to sufficiently cure the liquid resin that has entered recessed parts. If the uncured liquid resin remains on the front surface 5a of the substrate 5, the resin becomes more likely to remain on the front surface 5a when the protective component is separated from the substrate 5 finally. On the other hand, when the liquid resin is irradiated with ultraviolet in such a manner that the liquid resin that has entered recessed parts sufficiently cures, the liquid resin is excessively cured partly, and the protective component becomes more likely to be separated in processing of the substrate 5.

Thus, a resin sheet according to the present embodiment to be described below is used. In FIG. 2A and so forth, a sectional view schematically illustrating a resin sheet 3 according to the present embodiment is included. The resin sheet 3 has a resin coat layer 3a that is made at the outer surface and has flexibility and a liquid resin layer 3b surrounded by the resin coat layer 3a. The resin sheet 3 is deformable and can cure by being given energy from the external. The resin sheet 3 has a function of covering the front surface 5a of the substrate 5 and protecting the substrate 5.

Figure 1A:
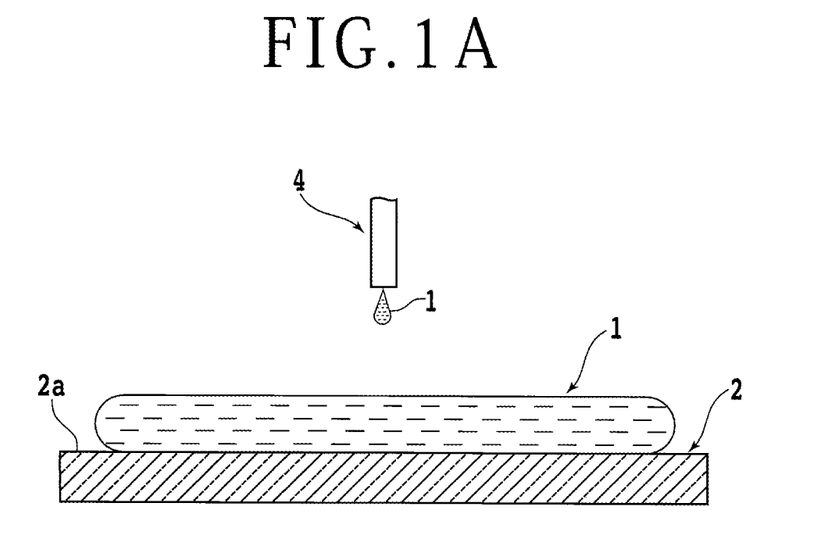
FIG. 1A is a sectional view schematically illustrating a liquid resin disposing step.
Figure 5A:
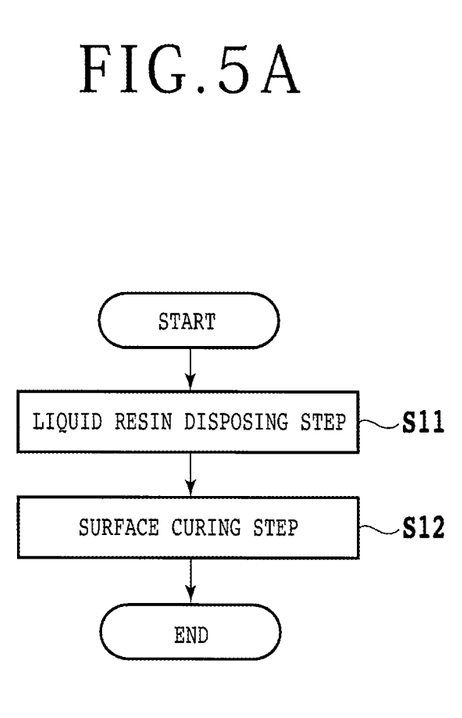
FIG. 5A is a flowchart illustrating the flow of the respective steps of a manufacturing method of a resin sheet.

Next, the respective steps of a manufacturing method of the resin sheet 3 will be described. FIG. 5A is a flowchart illustrating the flow of the respective steps of the manufacturing method of the resin sheet 3. First, a liquid resin disposing step S11 is executed. FIG. 1A is a sectional view schematically illustrating the liquid resin disposing step S11. In the liquid resin disposing step S11, a liquid resin 1 that can cure by being given energy from the external is disposed on a flat surface 2a. The liquid resin 1 is an ultraviolet-curable resin or heat-curable resin, for example. However, the liquid resin 1 is not limited thereto and may be formed of a resin material that can cure by another kind of energy given from the external. In the following, the resin sheet 3 according to the present embodiment, the manufacturing method thereof, and so forth will be described by taking, as an example, the case in which the liquid resin 1 is an ultraviolet-curable resin.

In the liquid resin disposing step S11, a plate 2 having a flat upper surface is prepared. It is preferable for the plate 2 to be formed of a component through which energy that can cure the liquid resin 1 can be transmitted. When the liquid resin 1 is an ultraviolet-curable resin, it is preferable for the plate 2 to be formed of a component through which ultraviolet can be transmitted. The plate 2 is formed of a material such as polyolefin, acrylic resin, or glass, for example. Supply of the liquid resin 1 to a flat surface 2a of the plate 2 is executed by a resin supply apparatus including a supply nozzle 4, for example. The liquid resin 1 is an acrylate-based, epoxy-based, or polyene-polythiol-based ultraviolet-curable resin, for example. The liquid resin 1 has fluidity as a liquid resin until receiving ultraviolet and cures when receiving irradiation with ultraviolet under a predetermined condition. When the supply nozzle 4 is positioned above the flat surface 2a and the liquid resin 1 is dropped onto the flat surface 2a from the supply nozzle 4, the liquid resin 1 spreads in all directions on the flat surface 2a.

Figure 1B:
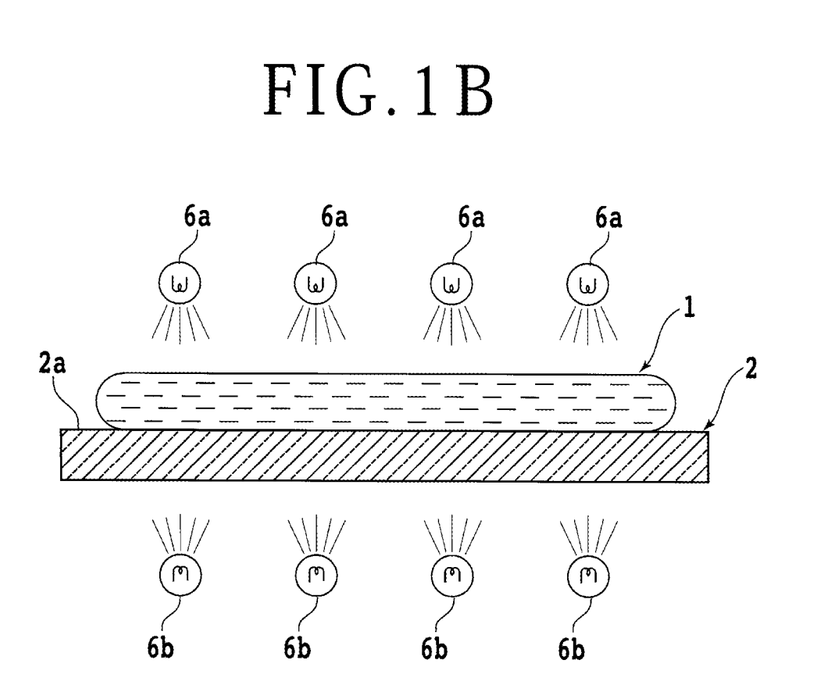
FIG. 1B is a sectional view schematically illustrating a surface curing step.

Next, a surface curing step S12 is executed. FIG. 1B is a sectional view schematically illustrating the surface curing step S12. In FIG. 2A, a sectional view schematically illustrating the resin sheet 3 formed by the surface curing step S12 is included. In the surface curing step S12, energy (ultraviolet) with such intensity that the whole of the liquid resin 1 does not cure is given to the liquid resin 1 from the external. Thereby, only the outer circumferential surface of the liquid resin 1 is cured to form the resin coat layer 3a and the liquid resin 1 that is not cured (liquid resin layer 3b) is left inside the resin coat layer 3a.

As illustrated in FIG. 1B, in the surface curing step S12, ultraviolet sources 6a and 6b are disposed as energy giving units over the plate 2 on which the liquid resin 1 is disposed on the flat surface 2a and under the plate 2. The ultraviolet sources 6a and 6b are ultraviolet fluorescent lamps or ultraviolet light-emitting diodes (LEDs), for example. When the ultraviolet sources 6a are actuated, the liquid resin 1 is irradiated with ultraviolet from the upper surface side of the liquid resin 1. When the ultraviolet sources 6b are actuated, irradiation with ultraviolet is executed from the lower surface side of the liquid resin 1 through the plate 2. In the surface curing step S12, it is preferable that the liquid resin 1 be irradiated with ultraviolet under a weaker irradiation condition than ultraviolet with which the resin sheet 3 is irradiated in a resin curing step S23 to be described later. Details thereof will be described later. When the illuminance or the irradiation time of the ultraviolet is increased, the curing of the liquid resin 1 progresses to a more inside region. That is, the thickness of the resin coat layer 3a formed is determined by the irradiation condition of the ultraviolet.

Furthermore, the thickness and the area of the resin sheet 3 formed are determined by properties such as the viscosity regarding the liquid resin 1 supplied to the plate 2 in the liquid resin disposing step S11, the amount of supply of the liquid resin 1, and so forth. It is preferable that the area of the resin sheet 3 be decided to be equivalent to the area of the substrate 5 on which the resin sheet 3 is disposed. Moreover, it is preferable that the thickness of the resin sheet 3 be set to a thickness with which the recessed and protruding shape of the front surface 5a of the substrate 5 can be sufficiently absorbed. For example, it is preferable that the total thickness of the resin sheet 3 formed be set to approximately 5 mm. Furthermore, it is preferable that the thickness of the resin coat layer 3a be set to approximately 0.5 mm. However, the resin sheet 3 formed is not limited thereto, and it is preferable that the thickness, area, and so forth of the resin sheet 3 be decided as appropriate according to the use purpose. In the resin sheet 3 formed in this manner, to put it simply, only the outer surface of the liquid resin 1 cures to become the resin coat layer 3a, and the liquid resin 1 that does not reach curing is surrounded by the resin coat layer 3a and becomes the liquid resin layer 3b. In other words, the resin coat layer 3a of the resin sheet 3 has a first resin material that is cured, and the inside liquid resin layer 3b has the first resin material that is not cured.

The boundary between the resin coat layer 3a and the liquid resin layer 3b of the resin sheet 3 is not necessarily clear. Furthermore, the irradiation intensity of ultraviolet is different between a region close to the outer surface of the liquid resin 1 and a region remote from the outer surface, and therefore the resin coat layer 3a is not necessarily evenly formed. It is also possible to refer to the whole of a region altered even slightly in the liquid resin 1 as the resin coat layer 3a. Alternatively, it is also possible to refer to only the region altered at the highest degree in the liquid resin 1 as the resin coat layer 3a. It is also possible to regard a region having different plural layers with plural degrees of alteration as the resin coat layer 3a. The resin coat layer 3a of this resin sheet 3 is capable of deformation through giving of an external force and can expand within a predetermined limit. The liquid resin layer 3b keeps the fluidity. Therefore, when the resin coat layer 3a is deformed, the inside liquid resin layer 3b is also deformed in such a manner as to follow the deformation of the resin coat layer 3a. That is, the resin sheet 3 is deformable. Furthermore, curing of the inside liquid resin layer 3b is enabled by further giving energy such as ultraviolet to the resin sheet 3 from the external, and the whole can be cured.

Figure 5B:
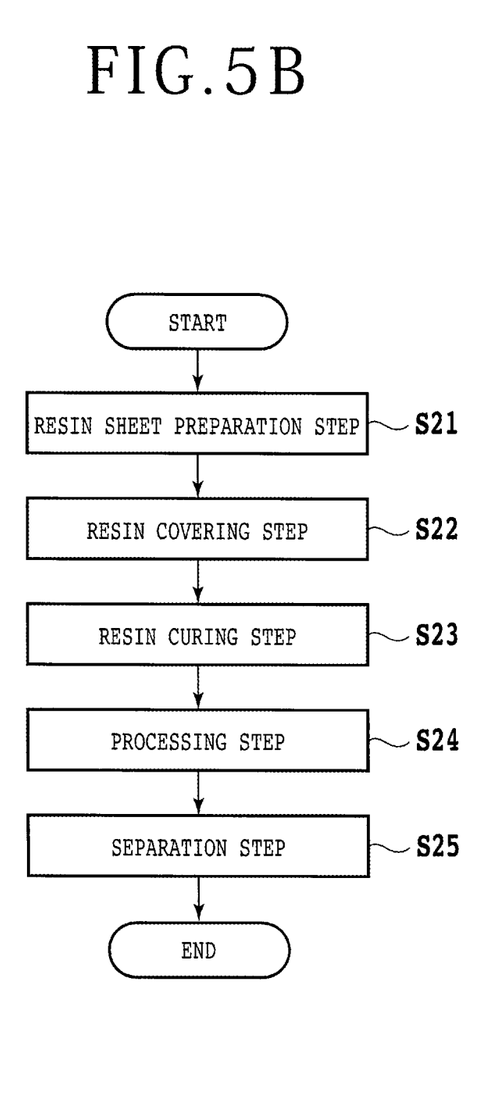
FIG. 5B is a flowchart illustrating the flow of the respective steps of a resin covering method.

Using the manufactured resin sheet 3 can form a protective component that can cover the front surface 5a of the substrate 5 having recesses and protrusions and protects the front surface 5a, for example. Next, a resin covering method for a substrate will be described as a use method of the manufactured resin sheet 3. FIG. 5B is a flowchart illustrating the flow of the respective steps of the resin covering method.

In the resin covering method, first, a resin sheet preparation step S21 is executed. In this resin sheet preparation step S21, the resin sheet 3 including the resin coat layer 3a and the liquid resin layer 3b is prepared. Alternatively, the above-described manufacturing method of the resin sheet 3 is executed in the resin sheet preparation step S21. That is, in the resin sheet preparation step S21, a resin of a liquid (liquid resin 1) is given energy (ultraviolet) with such intensity that the whole of the resin does not cure from the external. Thereby, a resin in the liquid state is left inside the resin, and only the outer circumferential surface is cured to obtain the resin sheet 3.

Figure 3A:
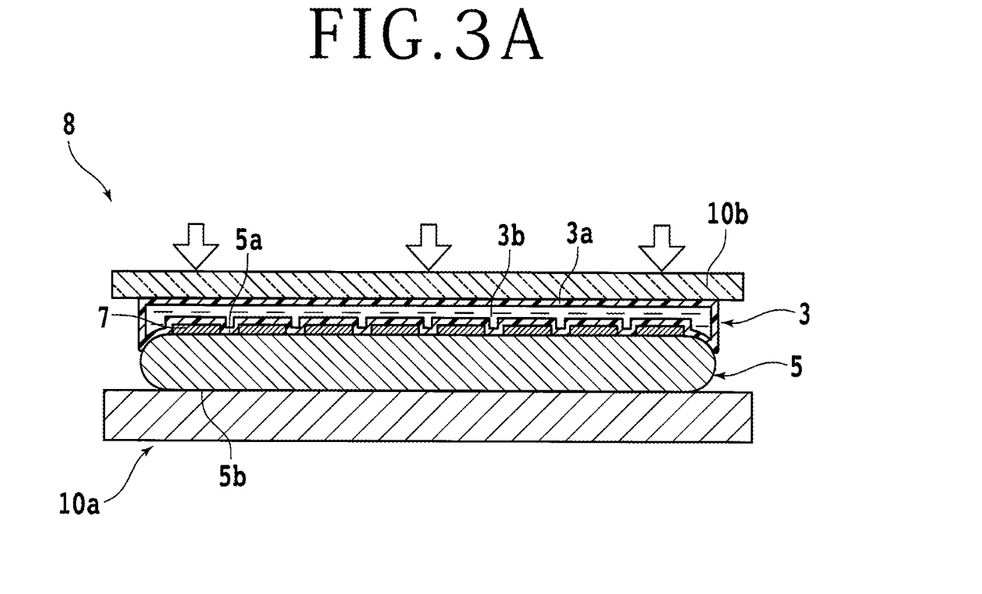
FIG. 3A is a sectional view schematically illustrating a resin covering step.

In the resin covering method, next, a resin covering step S22 of covering the front surface 5a of the substrate 5 by the resin sheet 3 prepared in the resin sheet preparation step S21 is executed. In the resin covering step S22, as a first stage, the resin sheet 3 is placed on the front surface 5a of the substrate 5. As a second stage, the resin sheet 3 placed on the substrate 5 is pressed from the upper side. FIG. 2B is a sectional view schematically illustrating the substrate 5 on which the resin sheet 3 is placed on the front surface 5a. FIG. 3A is a sectional view schematically illustrating the state in which the resin sheet 3 placed on the substrate 5 is pressed from the upper side. The substrate 5 has a recessed and protruding shape formed of the devices 7, bumps that are not illustrated in the diagram, and so forth in the front surface 5a. Thus, the resin sheet 3 does not sufficiently get contact with this recessed and protruding shape when being only placed on the front surface 5a. Thus, the resin sheet 3 is pressed from the upper side in order to cause the resin sheet 3 to be deformed in such a manner as to follow this recessed and protruding shape and bring the resin sheet 3 into contact with the front surface 5a in a sufficiently wide region.

In the resin covering step S22, a pressing apparatus 8 that can press the resin sheet 3 placed on the substrate 5 from the upper side may be used. Furthermore, the substrate 5 may be placed on a flat table 10a of the pressing apparatus 8 in advance. The pressing apparatus 8 includes a pressing plate 10b that has a bottom surface parallel to the upper surface of the table 10a and can lower toward the table 10a.

As illustrated in FIG. 2B, at the first stage of the resin covering step S22, the resin sheet 3 is placed on the substrate 5 to cover the whole of the front surface 5a of the substrate 5. Then, as illustrated in FIG. 3A, at the second stage of the resin covering step S22, the pressing plate 10b is lowered, and the resin sheet 3 is pressed from the upper side by the pressing plate 10b. Thereupon, the resin sheet 3 is pressed against the front surface 5a of the substrate 5, and the resin sheet 3 is deformed to follow recesses and protrusions of the front surface 5a of the substrate 5 in the region in contact with the front surface 5a. More specifically, at this time, the resin coat layer 3a of the resin sheet 3 partly expands or contracts to follow the recesses and protrusions, and the liquid resin layer 3b flows inside the resin sheet 3 according to the deformation of the resin coat layer 3a. Here, it is preferable that the thickness of the resin coat layer 3a of the resin sheet 3 be decided in a range in which breakage does not occur when the resin sheet 3 is deformed to follow the recessed and protruding shape of the front surface 5a of the substrate 5.

The resin sheet 3 can be deformed as far as the durability of the resin coat layer 3a permits, and the margin for deformation of the resin sheet 3 according to the present embodiment, inside which the liquid resin layer 3b exists, is large compared with the case in which the liquid resin layer 3b does not exist inside the resin sheet 3. If the liquid resin layer 3b does not exist, when the resin sheet 3 is locally deformed, a generated restoring force becomes large, or a large internal stress is generated so that the resin sheet 3 locally breaks in some cases. That is, the resin sheet 3 according to the present embodiment can be deformed comparatively easily.

Figure 3B:
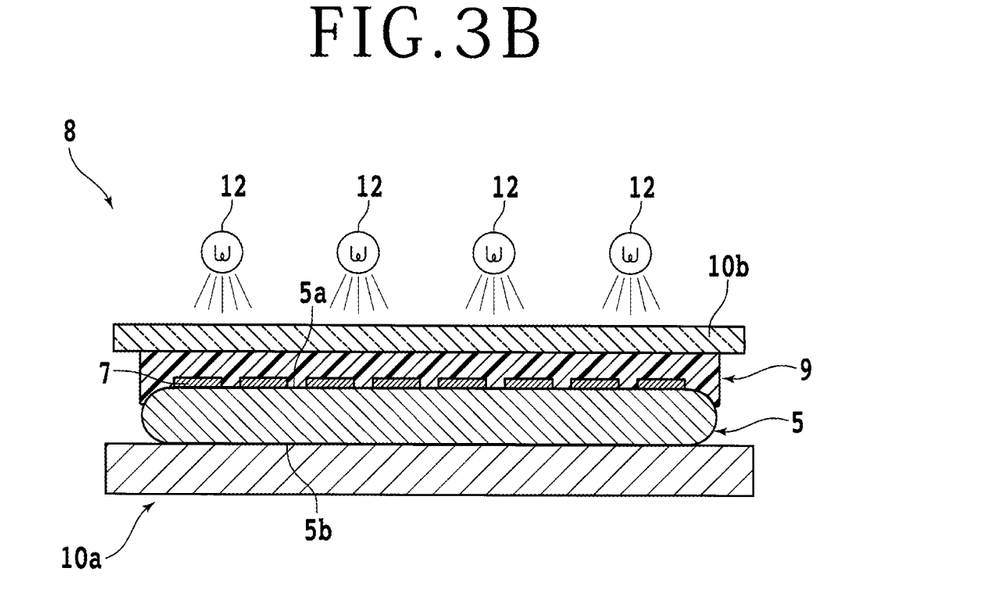
FIG. 3B is a sectional view schematically illustrating a resin curing step.

After the resin covering step S22, a resin curing step S23 of curing the whole of the resin sheet 3 is executed. FIG. 3B is a sectional view schematically illustrating the resin curing step S23. In the resin curing step S23, energy is given to the resin sheet 3 that covers the substrate 5 from the external, and the whole of the resin sheet 3 is cured. For example, when the resin that configures the resin sheet 3 is an ultraviolet-curable resin, the resin sheet 3 is irradiated with ultraviolet in the resin curing step S23. Here, it is preferable that the pressing plate 10b be formed of a component through which ultraviolet can be transmitted so that the resin sheet 3 can be irradiated with ultraviolet through the pressing plate 10b. For example, the pressing plate 10b is formed of a material such as polyolefin, acrylic resin, or glass. Furthermore, the pressing apparatus 8 includes ultraviolet sources 12 as energy giving units. The ultraviolet sources 12 are ultraviolet fluorescent lamps or ultraviolet LEDs, for example. When the ultraviolet sources 12 are actuated, the resin sheet 3 is irradiated with ultraviolet through the pressing plate 10b.

In the resin curing step S23, it is preferable that the resin sheet 3 be irradiated with ultraviolet under a stronger irradiation condition than the ultraviolet with which the liquid resin 1 is irradiated in the surface curing step S12 so that the whole of the liquid resin layer 3b of the resin sheet 3 can be cured. When the whole region of the resin sheet 3 has been cured, a protective component 9 formed of the resin is disposed on the front surface 5a of the substrate 5. The protective component 9 has a function of protecting the front surface 5a when the substrate 5 is processed from the side of the back surface 5b. As described later, the substrate 5 is supported with the interposition of the protective component 9 when the back surface 5b is processed. Thus, in order to suppress inclination of the substrate 5 to be processed, in the pressing apparatus 8 used in the resin curing step S23, the orientation of the bottom surface of the pressing plate 10b that defines the upper surface of the protective component 9 needs to be adjusted with high accuracy in such a manner that the bottom surface of the pressing plate 10b becomes parallel to the back surface 5b.

Figure 4A:
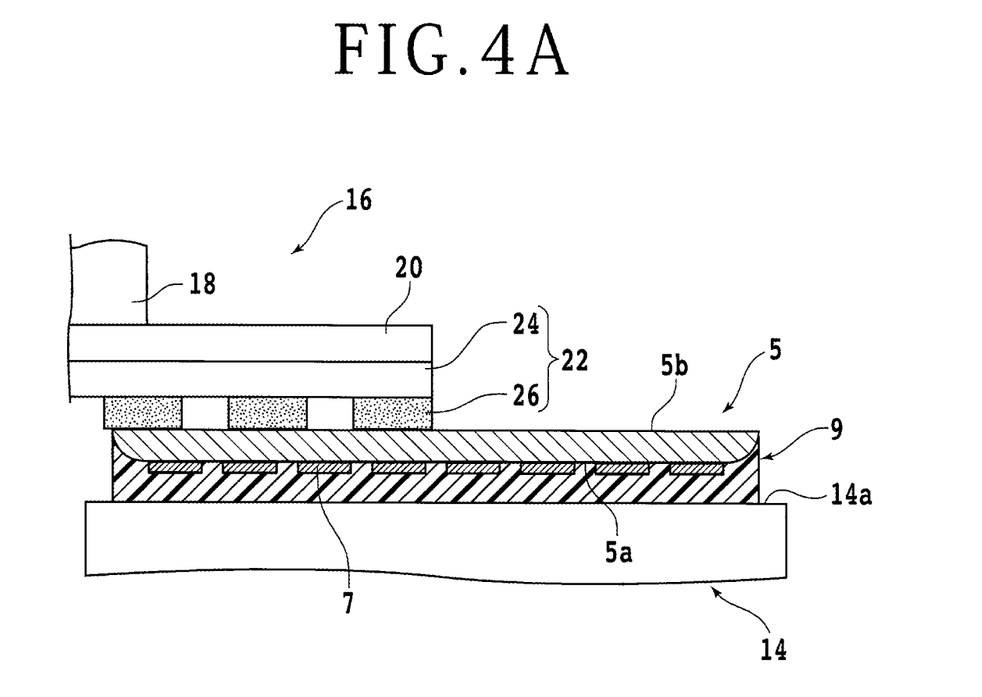
FIG. 4A is a sectional view schematically illustrating a processing step.

Thereafter, the substrate 5 on which the protective component 9 is disposed on the front surface 5a is processed from the back surface 5b. Next, a processing step S24 executed after the resin curing step S23 will be described. FIG. 4A is a sectional view schematically illustrating the processing step S24. In the processing step S24, for example, the substrate 5 is ground from the side of the back surface 5b and is thinned.

A grinding apparatus 16 that executes grinding of the substrate 5 includes a chuck table 14 that can suck and hold the substrate 5 with the interposition of the protective component 9 and a grinding wheel 22 that grinds the substrate 5 sucked and held by the chuck table 14. The chuck table 14 includes, at the center of the upper surface, a circular plate-shaped porous component (not illustrated) having a diameter equivalent to the diameter of the substrate 5 and a suction source (not illustrated) is connected to this porous component through a suction path that is not illustrated in the diagram. When the substrate 5 is placed over the chuck table 14 with the interposition of the protective component 9 with the side of the front surface 5a oriented downward and the suction source is actuated, a negative pressure acts on the substrate 5 through the suction path and the porous component, and the substrate 5 is sucked and held by the chuck table 14. The upper surface of the porous component of the chuck table 14 functions as a holding surface 14a.

The grinding wheel 22 has a circular annular wheel base 24. The wheel base 24 is formed of a metal such as aluminum and is set to have a diameter corresponding to the diameter of the substrate 5 that becomes a workpiece. Plural grinding abrasive stones 26 annularly arranged are disposed at the outer circumferential part of the lower surface (bottom surface) side of the wheel base 24. Each grinding abrasive stone 26 is formed by mixing abrasive grains of diamond, cubic boron nitride (cBN), or the like with a bond such as a vitrified or resinoid bond and sintering the mixture, for example. The grinding wheel 22 is fixed to the lower surface of a wheel mount 20 connected to the lower end of a spindle 18 that configures a rotation axis. To the upper end of the spindle 18, a rotational drive source such as a motor that rotates the spindle 18 around the rotation axis along a direction substantially perpendicular to the holding surface 14a is connected. Furthermore, the chuck table 14 can rotate around an axis perpendicular to the holding surface 14a.

When the substrate 5 is ground, the chuck table 14 is rotated, and the spindle 18 is rotated. Then, the spindle 18 is lowered to bring the grinding abrasive stones 26 that move on an annular locus into contact with the back surface 5b of the substrate 5. Thereupon, the substrate 5 is ground and is gradually thinned. Thereafter, the lowering of the spindle 18 is stopped when the thickness of the substrate 5 has become a predetermined thickness, and the grinding of the substrate 5 is ended. During this grinding, the side of the front surface 5a of the substrate 5 is protected by the protective component 9. Thereafter, the suction holding of the substrate 5 by the chuck table 14 is released, and the substrate 5 is carried out from the grinding apparatus 16.

Figure 4B:
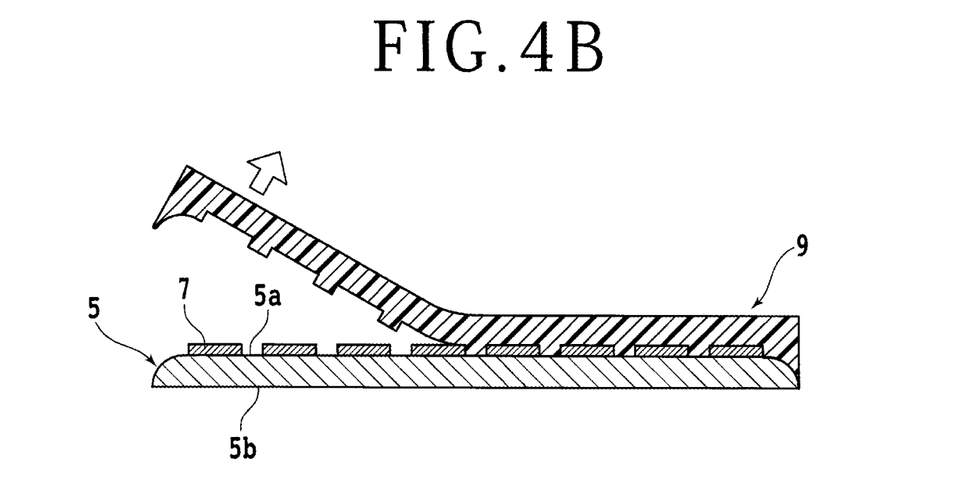
FIG. 4B is a sectional view schematically illustrating a separation step.

The processing of the substrate 5 executed in the processing step S24 is not limited to the grinding. For example, the substrate 5 may be polished from the side of the back surface 5b and may be divided for each device 7. After the processing step S24 is executed, a separation step S25 of separating the resin sheet 3 (protective component 9) that covers the front surface 5a of the substrate 5 from the substrate 5 is executed. FIG. 4B is a sectional view schematically illustrating the separation step S25. When the separation step S25 is executed, the protective component 9 may be irradiated with ultraviolet with high intensity and be cured in advance in order to make the separation of the protective component 9 easy. Alternatively, the protective component 9 may be heated, and the protective component 9 may be softened. When the separation step S25 has been executed, the processed substrate 5 is obtained.

As described above, in the resin covering method according to the present embodiment, the resin sheet 3 in which the outer surface is cured in advance is disposed on the front surface 5a of the substrate 5. That is, the already-cured resin (resin coat layer 3a) enters recessed parts of the front surface 5a. Thus, there is no need to excessively irradiate the resin sheet 3 with ultraviolet, and the protective component 9 that is less liable to be separated can be disposed on the front surface 5a of the substrate 5. In addition, the resin becomes less likely to remain on the front surface 5a when the protective component 9 is separated from the substrate 5 at the time of the end of processing of the substrate 5. That is, when the resin sheet 3 is used, the front surface 5a of the substrate 5 can be covered by the resin (protective component 9) while recesses and protrusions of the front surface 5a are sufficiently absorbed. Thereafter, the resin remains on the front surface 5a less readily when the resin (protective component 9) is separated from the substrate 5.

In the above-described embodiment, the description has been made by taking as an example the case in which the liquid resin 1 (resin sheet 3 and so forth) is configured by an ultraviolet-curable resin that cures by ultraviolet. However, the liquid resin 1 (resin sheet 3 and so forth) that cures through being given energy may cure by being given energy other than the ultraviolet from the external. For example, the liquid resin 1 may be a heat-curable resin that cures by being heated. Also in this case, when the liquid resin 1 is heated under such a heating condition that only the outer surface of the liquid resin 1 cures and the inside does not cure, the resin sheet 3 including the resin coat layer 3a and the liquid resin layer 3b can be manufactured. That is, in the surface curing step S12, only the outer circumferential surface of the liquid resin 1 is cured by using a heat source such as a heater or an infrared lamp and giving heat to the liquid resin 1 as energy. In this case, when the resin sheet 3 is heated under such a condition that the whole region of the resin sheet 3 cures after the front surface 5a of the substrate 5 is covered by the formed resin sheet 3 and pressing the resin sheet 3 from the upper side to cause the resin sheet 3 to be deformed to follow the front surface 5a, the front surface 5a of the substrate 5 is covered by the protective component 9. That is, in the resin curing step S23, the liquid resin layer 3b is cured by using a heat source such as a heater or an infrared lamp and giving heat to the resin sheet 3 as energy.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A resin sheet that covers a front surface of a substrate and protects the substrate, the resin sheet comprising:
   a resin coat layer that is made at an outer surface and of the resin sheet by curing only the outer surface of a disposed liquid resin which forms the resin sheet by giving energy with such intensity to the whole of the disposed liquid resin such that only the outer surface is cured, wherein the resin coat layer has flexibility; and
   an uncured liquid resin layer entirely surrounded and encapsulated by the resin coat layer, wherein:
   the resin sheet is deformable so as to follow recessed and protruding shapes on the front face of the substrate and is capable of fully curing by being given additional energy from an external.

2. The resin sheet according to claim 1, wherein the energy is ultraviolet or heat.

3. A manufacturing method of a resin sheet that is capable of being deformed, covering a front surface of a substrate, and protecting the substrate and that is capable of curing by being given energy from an external, the manufacturing method comprising:
   a liquid resin disposing step of disposing a liquid resin capable of curing by being given the energy from the external on a flat surface; and
   a surface curing step of forming a resin coat layer through curing only an outer surface of the liquid resin by giving the energy with such intensity that whole of the liquid resin does not cure to the liquid resin from the external and leaving the liquid resin that is not cured inside the resin coat layer.

4. The manufacturing method of a resin sheet according to claim 3, wherein
   the liquid resin is an ultraviolet-curable resin or a heat-curable resin.

5. A resin covering method for a substrate by which a front surface of the substrate having recesses and protrusions is covered by a resin sheet, the resin covering method comprising:
   a resin sheet preparation step of preparing the resin sheet formed by giving, to a resin of a liquid, energy with such intensity that whole of the resin does not cure from an external to leave the resin in a liquid state inside the resin and cure only an outer surface;
   a resin covering step of covering the front surface of the substrate by the resin sheet prepared in the resin sheet preparation step in such a manner that the resin sheet is caused to follow the recesses and protrusions of the substrate; and
   a resin curing step of giving the energy to the resin sheet that covers the substrate from the external and curing whole of the resin sheet after the resin covering step.

6. The resin covering method according to claim 5, further comprising:
   a processing step of processing a back surface of the substrate after the resin covering step; and
   a separation step of separating the resin sheet that covers the substrate and is cured from the substrate.

7. The resin covering method according to claim 6, wherein
   the back surface of the substrate is ground by using a grinding wheel including a grinding abrasive stone in the processing step.

8. The resin covering method according to claim 5, wherein
   the resin is an ultraviolet-curable resin or a heat-curable resin.

* * * * *

UNITED STATES PATENT AND TRADEMARK OFFICE
CERTIFICATE OF CORRECTION

PATENT NO. : 12,421,362 B2  
APPLICATION NO. : 17/664746  
DATED : September 23, 2025  
INVENTOR(S) : Yoshinori Kakinuma et al.

Page 1 of 1

It is certified that error appears in the above-identified patent and that said Letters Patent is hereby corrected as shown below:

In the Claims

Column 11, Claim 1, Line 31, delete "and"

Signed and Sealed this  
Thirtieth Day of December, 2025

John A. Squires  
*Director of the United States Patent and Trademark Office*